(12) United States Patent
Donnelly

(10) Patent No.: US 7,293,775 B1
(45) Date of Patent: Nov. 13, 2007

(54) ROPING PRACTICE APPARATUS

(76) Inventor: James L. Donnelly, 609 Normandy La., Saginaw, TX (US) 76179

( * ) Notice: Subject to any disclaimer, the term of this patent is extended or adjusted under 35 U.S.C. 154(b) by 0 days.

(21) Appl. No.: 11/529,788

(22) Filed: Sep. 29, 2006

(51) Int. Cl.
A63B 69/00 (2006.01)
A01K 15/02 (2006.01)

(52) U.S. Cl. ...................... 273/359; 119/839

(58) Field of Classification Search ............ 273/339, 273/359, 336, 317, 348; 119/839
See application file for complete search history.

(56) References Cited

U.S. PATENT DOCUMENTS

| | | | | |
|---|---|---|---|---|
| 3,303,821 | A | * | 2/1967 | Harris ................. 119/839 |
| 3,711,098 | A | * | 1/1973 | McCord ............... 273/336 |
| 3,776,553 | A | * | 12/1973 | Kelton ................ 273/339 |
| 3,947,033 | A | | 3/1976 | Bennett |
| 3,974,799 | A | * | 8/1976 | Parsons ............... 273/336 |
| 4,136,874 | A | | 1/1979 | McCord |
| 4,266,779 | A | * | 5/1981 | English ............... 119/839 |
| 4,268,037 | A | | 5/1981 | McKinley et al. |
| 4,286,788 | A | * | 9/1981 | Simington et al. ...... 273/359 |
| 4,364,570 | A | | 12/1982 | Hallam |
| 4,451,045 | A | | 5/1984 | Fesmire |
| 4,498,676 | A | | 2/1985 | Runner |
| 4,640,515 | A | | 2/1987 | Rhine |
| 4,662,642 | A | | 5/1987 | Archibald et al. |
| 4,874,179 | A | | 10/1989 | Henderson |
| 4,981,302 | A | | 1/1991 | Narramore |
| 4,995,618 | A | | 2/1991 | Panzner |
| 5,009,432 | A | | 4/1991 | Richard |
| 5,080,373 | A | | 1/1992 | Jones |
| 5,286,032 | A | * | 2/1994 | Spencer .............. 273/339 |
| 5,568,926 | A | | 10/1996 | Kaptein |
| 5,709,386 | A | | 1/1998 | Nelson |
| 5,775,698 | A | * | 7/1998 | Jones et al. ........... 273/359 |
| 6,497,411 | B1 | | 12/2002 | Nelson |
| 6,629,695 | B2 | * | 10/2003 | Tisdell .............. 273/359 |
| 6,736,399 | B1 | | 5/2004 | Copehaver |
| 6,945,534 | B1 | * | 9/2005 | Lindsey .............. 273/359 |
| 2003/0034613 | A1 | * | 2/2003 | Tisdell .............. 273/359 |
| 2006/0170163 | A1 | * | 8/2006 | Perkins .............. 273/359 |

* cited by examiner

Primary Examiner—Raleigh W. Chiu
(74) Attorney, Agent, or Firm—Lynn E. Barber

(57) ABSTRACT

A roping practice apparatus simulated steer assembly for roping practice, having a base having a vertical support mechanism mounted on the base; a body mounted on the vertical support mechanism and having a front end, a back end, a left side and a right side; legs mounted on the back end of the body; a head portion mounted on the front end so that the head pivots toward the left side when roped; a rocker arm mounted on the vertical support mechanism; a spring and cable system connecting each of the legs to the rocker arm for moving the legs backward and forward; and a power source operatively connected to the rocker arm. The assembly may be towed or may be radio-controlled.

10 Claims, 14 Drawing Sheets

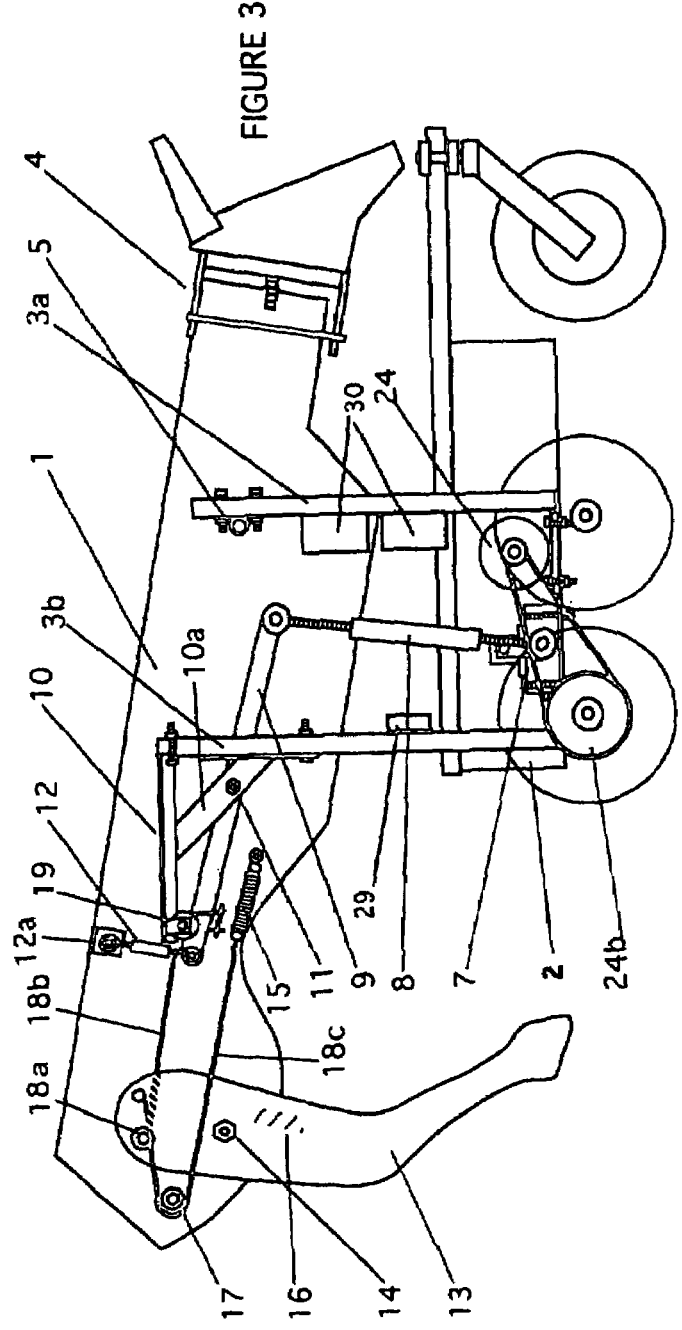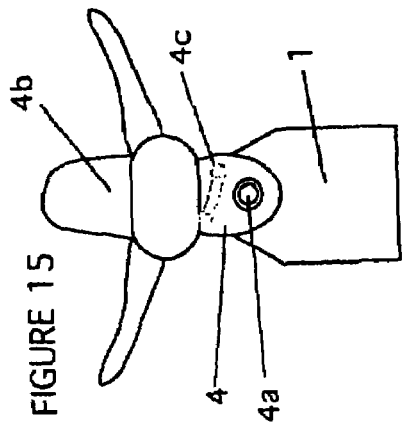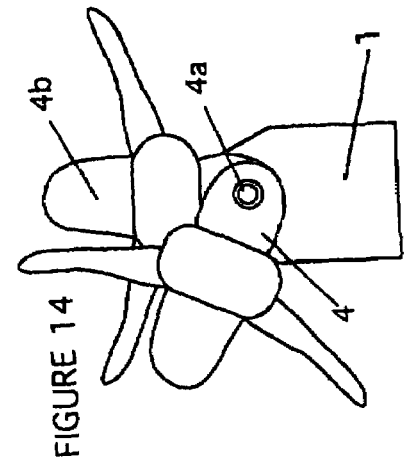

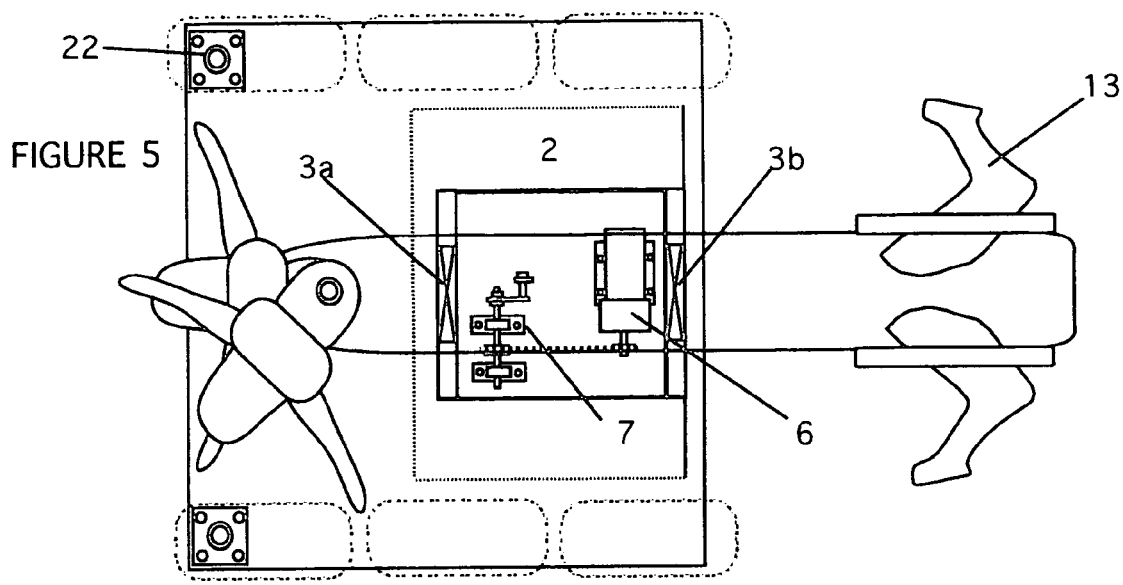
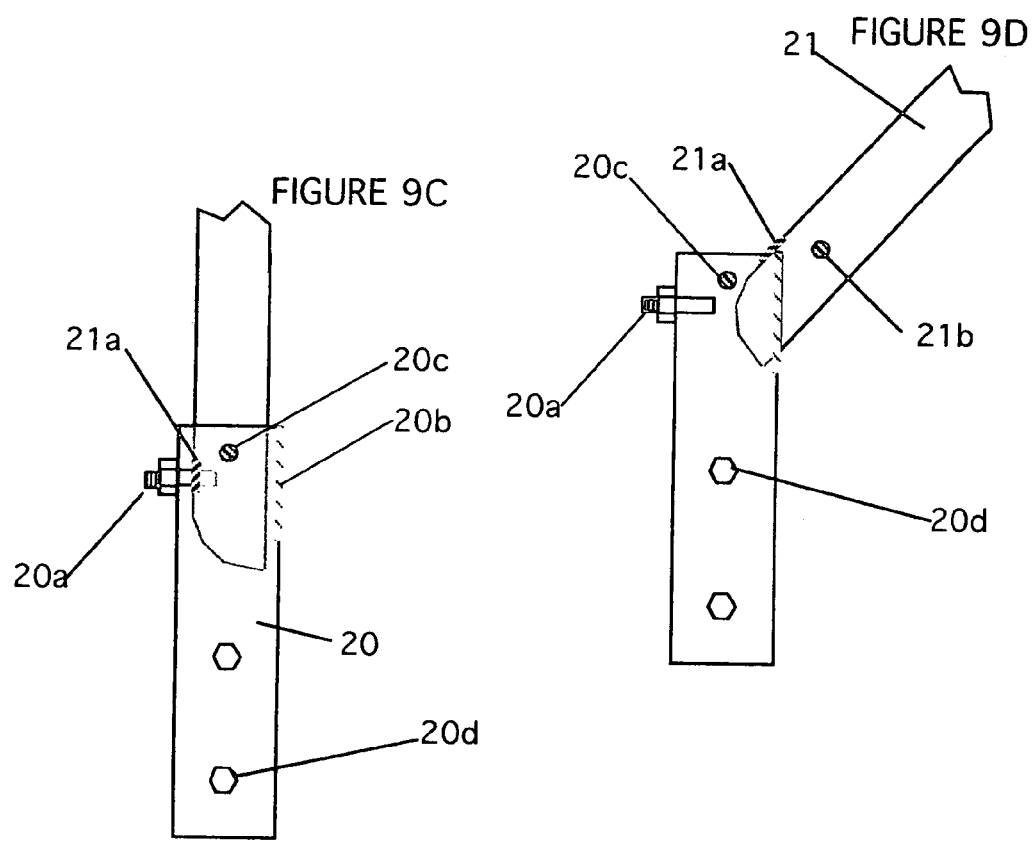

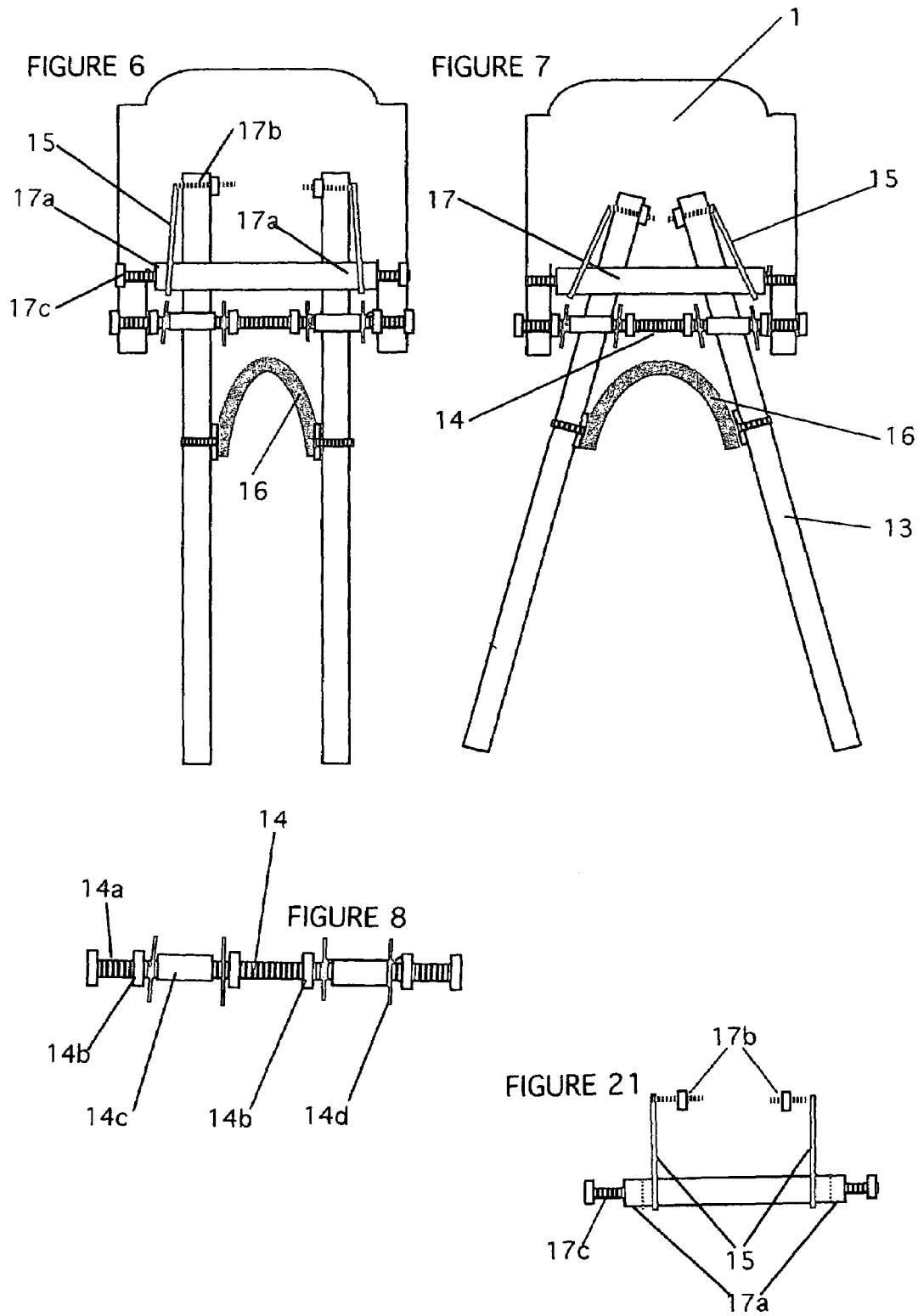

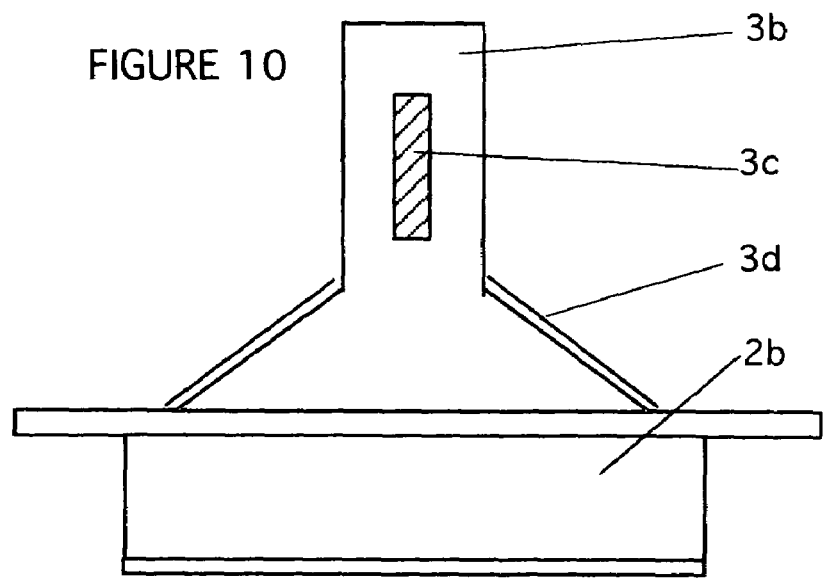
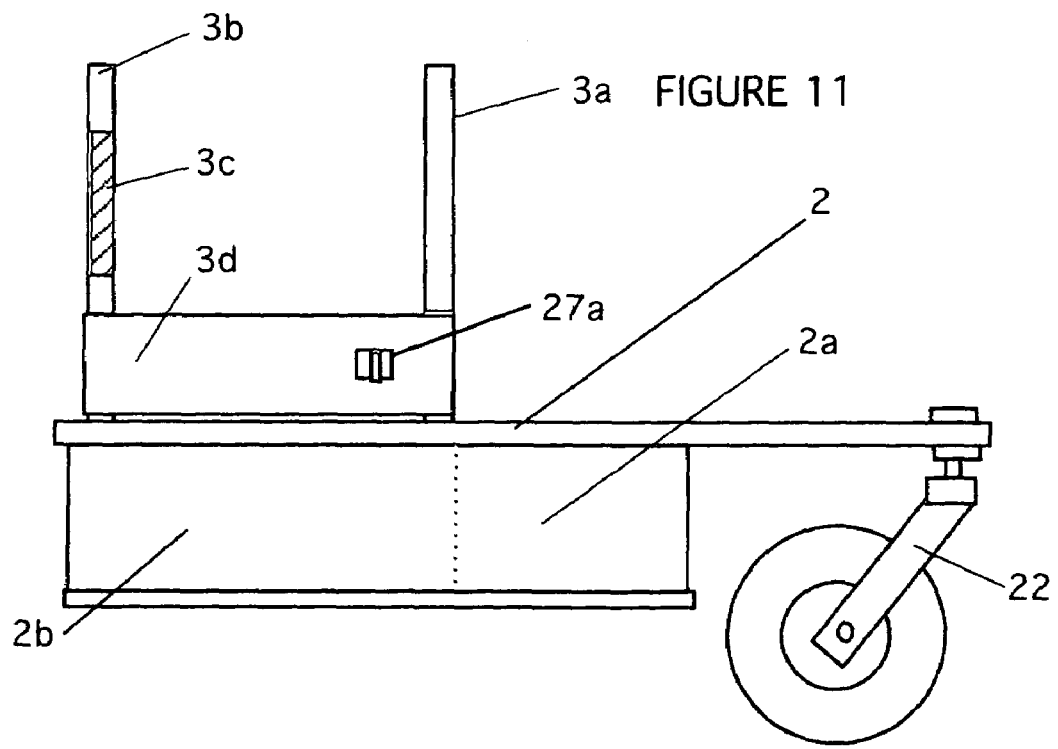

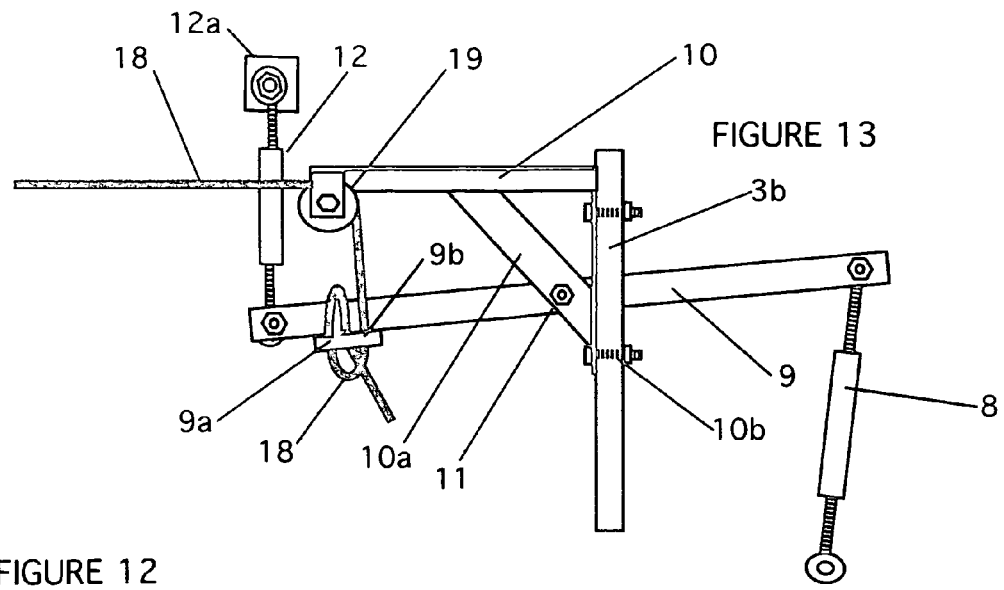
FIGURE 13
FIGURE 12
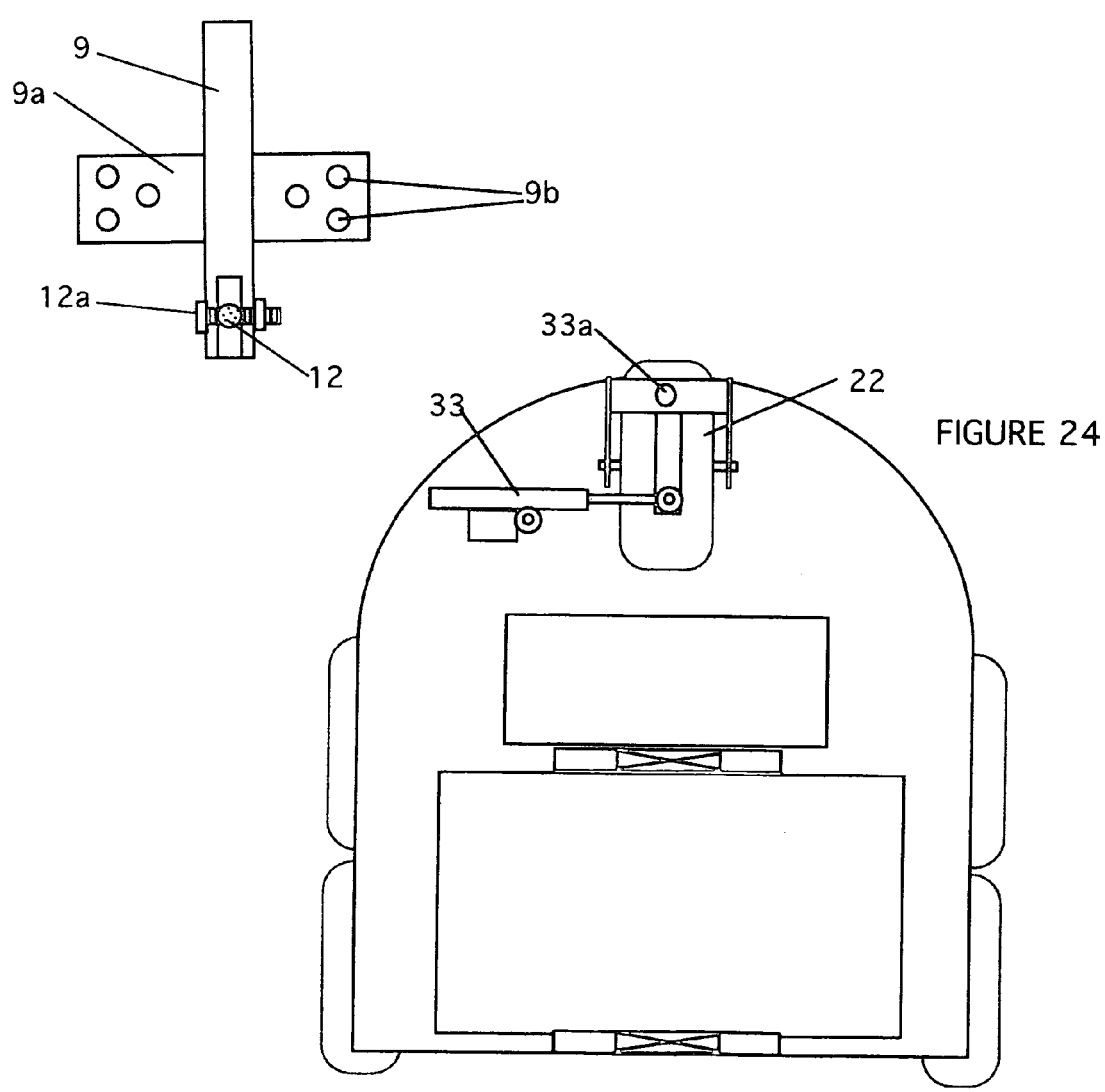
FIGURE 24

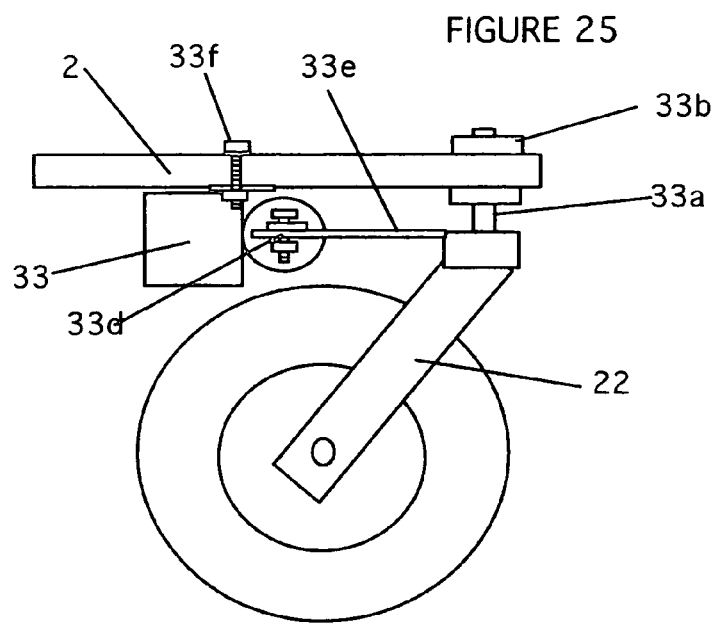
FIGURE 25
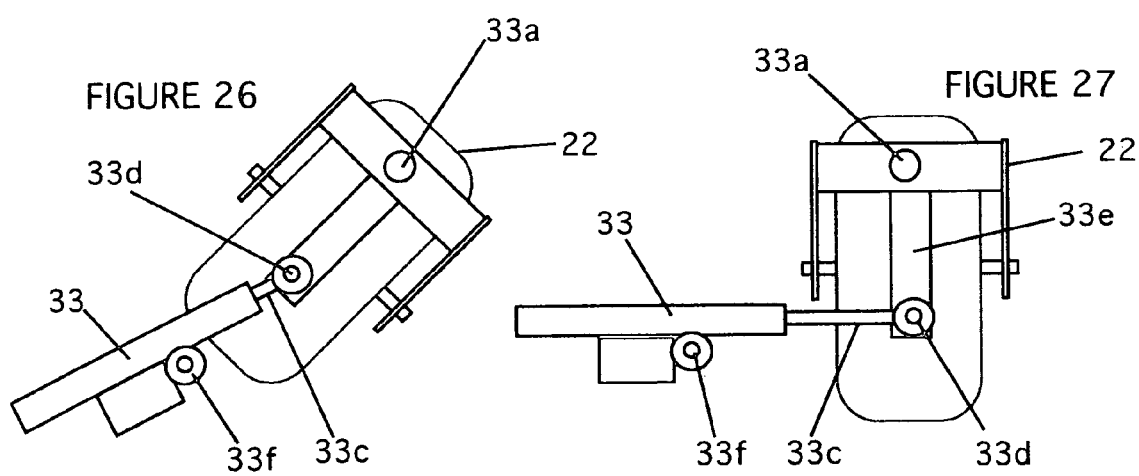
FIGURE 26
FIGURE 27
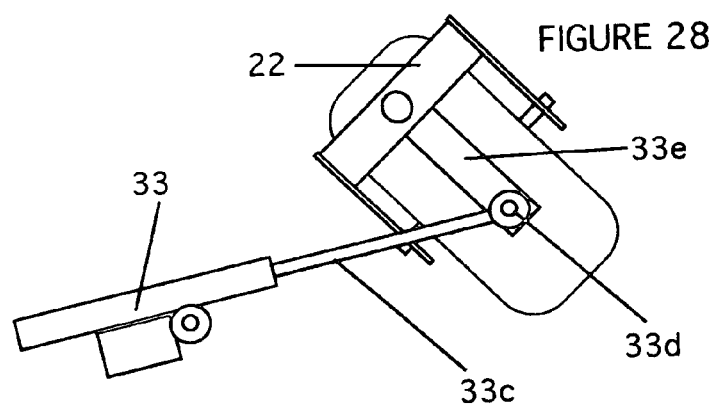
FIGURE 28

ROPING PRACTICE APPARATUS

BACKGROUND OF THE INVENTION

1. Field of the Invention

This invention relates to rodeo training devices, particularly to devices simulating an animal to be roped.

2. Description of the Related Art

Steer roping is a rodeo event that requires considerable skill of two mounted ropers, the header in roping a released steer's head and turning it to the left, and the heeler in roping the hind legs of the steer and turning in the opposite direction to immobilize the steer. This skill requires much practice to perfect, but it is often difficult to have enough animals to practice on without causing undue stress to the practice animals.

Therefore, there have been many different simulated steer apparatuses developed to allow practice without a living steer. Generally, these simulations involve a simulated animal torso attached to a support at the head end of the simulated body, and simulated rear legs at the tail end of the simulated body. The apparatus of Nelson (U.S. Pat. No. 5,709,386) has a cam arrangement for up and down lifelike movement of the simulated animal torso so that the hind legs pivot and move rearward as the torso moves down, and move forward as the torso moves upward, with the speed of movement being adjustable. The apparatus is mounted on a support frame for towing. While the possibility of having a head on the steer torso is mentioned, no details are provided.

Other patents having movable leg simulations include that of Fesmire (U.S. Pat. No. 4,451,045) for an apparatus having a frame with pulleys to pivot the simulated bovine legs through an arc of predetermined magnitude; Rhine (U.S. Pat. No. 4,460,515) for a mechanical steer having a frame member mounted on a coil spring support, with rear legs pivotally mounted on the end and horns on the other end, so that when the horns are roped, the legs are caused to be pulled sideways; Archibald et al. (U.S. Pat. No. 4,662,642) for a roping practicing dummy mounted on elongated members for towing, and having elliptically shaped wheels between them which are connected to a simulated cow, so that when the dummy is towed, the wheels rotate and the forward end of the dummy moves up and down and the rear end moves back and forth; Narramore (U.S. Pat. No. 4,981,302) for a roping practice device in which rear extension members simulate the animal's rear legs and oscillate between upper and lower positions; Panzner (U.S. Pat. No. 4,995,618) for a moveable roping target having pendulum swinging legs and being rotatably mounted on a pedestal member; Kaptein (U.S. Pat. No. 5,568,926) in which the simulated bovine animal is mounted on a frame on a wheeled cart, with a front pivot to attach a head and a rear pivot to attach at least on pair of legs; and Copenhaver (U.S. Pat. No. 6,736,399) in which the front of the simulated animal is mounted on wheels and an actuation mechanism causes the rear legs to pivot as the animal is moved across a surface, and the stride of the simulated animal may be adjusted to more closely approximate a living steer;

The vertically adjustable roping apparatus of McCord (U.S. Pat. No. 4,136,874), while also having pivotally support hind legs, emphasizes a tow-cable release mechanism so that when the horns of the simulated animal are roped as the device is towed, the horns are removed from the head, causing the release of the tow-cable. Release also occurs if the body is roped, but when the head is roped, the release is not triggered. Likewise, the apparatus of Richard (U.S. Pat. No. 5,009,432) provides a quick release member on a wheeled support carrying a hinged animal torso unit. Forcible rearward movement of either or both legs engaged by a rope causes disengagement from the towing vehicle.

The steer roping training device of Bennett (U.S. Pat. No. 3,947,033) is self powered, and has base and body sections interconnected to permit pivotal movement of the body relative to the base, and springs maintain the sections in a generally upright position. The simulated leg sections are a fixed part of the body.

The roping system of Runner (U.S. Pat. No. 4,498,676) also provides a moving target without providing separately movable legs. This system also includes a frame simulating a horse for the roper to sit on, so that no live animals are required for the practice. The apparatus of Jones (U.S. Pat. No. 5,080,373) also has a mount simulator and this mount simulator is mounted in fixed relationship to a target, but this target does have pivotal rear legs.

Other practice means simply provide mounted simulated rear legs for practice (e.g., U.S. Pat. No. 4,874,179 of Henderson) or simulated horns (e.g., U.S. Pat. Nos. 4,268,037 of McKinley et al.; 4,364,570 of Hallam; and 6,497,411 of Nelson).

Many of the prior roping devices are very unrealistic in movement and do not allow the roper's skill to be improved in a manner that is easily translatable to a living steer. Further, many of these devices do not allow both a header and a heeler to practice.

The most lifelike prior roping devices provide a simulated steer that may be towed to simulate the running of a steer. Because this requires that a motor vehicle tow the device, the spontaneous move in a manner that causes the simulated steer to make sudden starts, stops or turns as would occur with a living steer.

It is therefore an object of the invention to provide a roping practice apparatus that is a realistic to allow both a header and a heeler to practice in a manner easily translatable to a living steer. It is a further object of the invention to provide a roping practice apparatus simulating a living steer that in its preferred embodiment can be made to move across the ground in a desired course and at a desired speed without being towed.

Other objects and advantages will be more fully apparent from the following disclosure and appended claims.

SUMMARY OF THE INVENTION

The invention herein is a roping practice apparatus simulated steer assembly for roping practice, having a base having a vertical support mechanism mounted on the base; a body mounted on the vertical support mechanism and having a front end, a back end, a left side and a right side; legs mounted on the back end of the body; a head portion mounted on the front end so that the head pivots toward the left side when roped; a rocker arm mounted on the vertical support mechanism; a spring and cable system connecting each of the legs to the rocker arm for moving the legs backward and forward; and a power source operatively connected to the rocker arm.

Other objects and features of the inventions will be more fully apparent from the following disclosure and appended claims.

BRIEF DESCRIPTION OF THE DRAWINGS

FIG. 3 is a schematic side view of an embodiment of a simulated steer assembly of the invention herein with the hind legs forward and the back end up.

FIG. 5 is an upper schematic view of a steer assembly of the invention.

FIG. 6 is a rear schematic view of the steer assembly showing the hind legs close together.

FIG. 7 is a rear schematic view of the steer assembly showing the hind legs spread apart.

FIG. 8 is a detailed view of the leg hinge pin.

FIG. 9C is a partial upper planar schematic view of the release mechanism of the releasable tow bar showing the details of the release mechanism.

FIG. 9D is a partial upper planar schematic view of the release mechanism of the releasable tow bar showing the details of the release mechanism.

FIG. 10 is a schematic rear elevational view of the base and rear support post.

FIG. 11 is a schematic side elevational view of the base and support posts.

FIG. 12 is a schematic top view of the rocker arm, adjustment plate and turnbuckle bolt adjustment for body height.

FIG. 13 is a schematic elevational view of the rocker arm and cable arrangement for moving the body and legs of the simulated steer assembly.

FIG. 14 is an upper planar schematic view of the head of the simulated steer assembly showing alternative positions of the head, from forward facing to facing to the left.

FIG. 15 is an upper planar schematic view of the head of the simulated steer assembly showing the neck spring that makes the head snap back to the forward facing position.

FIG. 21 is a detailed view of the roller pulley assembly.

FIG. 24 is an upper plan view of the radio-controlled embodiment of the invention showing the location of the front caster wheel and linear actuator of a preferred caster wheel configuration.

FIG. 25 is a side elevational view of the preferred caster wheel configuration of FIG. 24.

FIG. 26 is an upper plan view of the preferred caster wheel configuration showing it turning right.

FIG. 27 is an upper plan view of the preferred caster wheel configuration showing it going straight forward.

FIG. 28 is an upper plan view of the preferred caster wheel configuration showing it turning left.

DETAILED DESCRIPTION OF THE INVENTION AND PREFERRED EMBODIMENTS THEREOF

The present invention is a roping practice apparatus simulating in its first preferred embodiment a steer for using by a header and a heeler in roping practice; and in its second preferred embodiment a steer and heeler horse for use in roping practice. There are two main embodiments of the invention, a towed embodiment and a radio-controlled embodiment as discussed herein. Except for the different means of moving the invention in the two embodiments, the other components of the two embodiments are essentially the same or are identical. Thus, the internal components of the simulated steer assembly directing the movement of the steer body, the hind legs and the head are the same in these two embodiments and are not affected by the means of moving the apparatus of the invention.

Referring now to the figures, as shown in FIGS. 1-5, the simulated steer assembly in the first embodiment comprises a simulated steer body 1 on a platform base 2 that is designed to be towed in use, and therefore includes a tow bar 21 (FIG. 9a) as is more known generally in the art, which is connected to the base and attachable to a towing vehicle (not shown).

Figure 1:
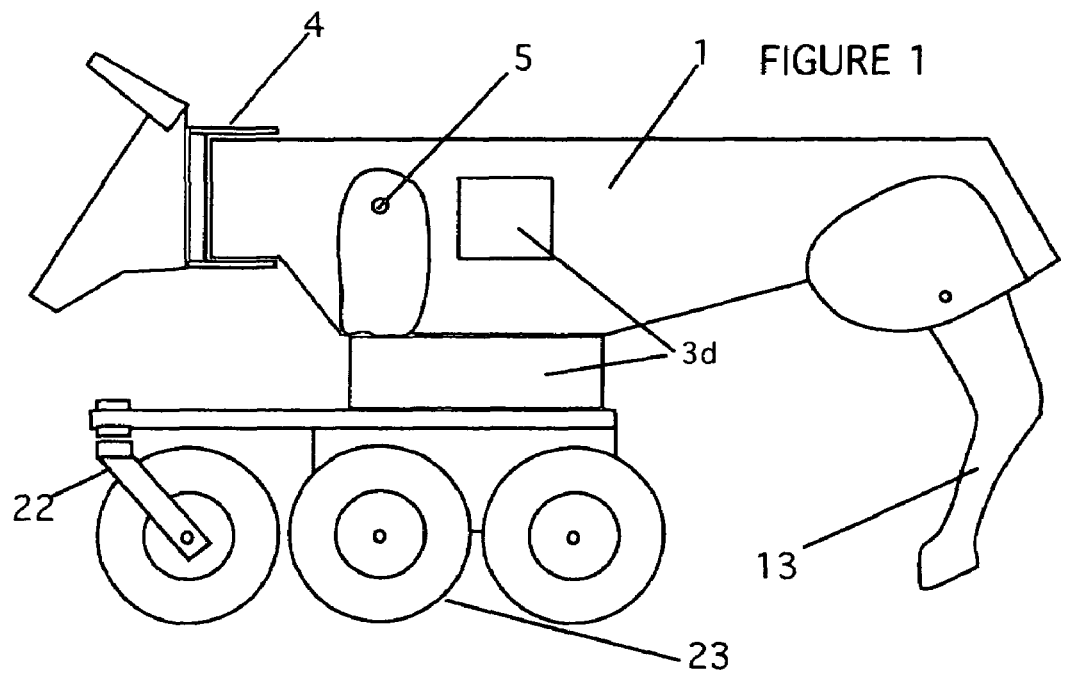
FIG. 1 is an elevational side view of a simulated steer assembly of the invention showing the base and wheels.
Figure 2:
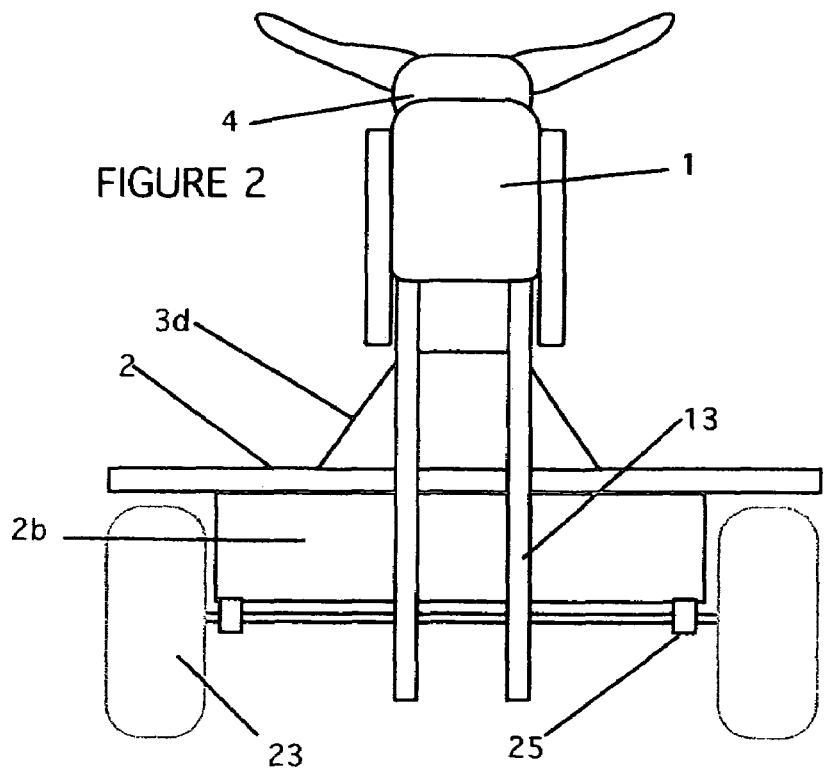
FIG. 2 is an elevational rear view of the assembly shown in FIG. 1.
Figure 4:
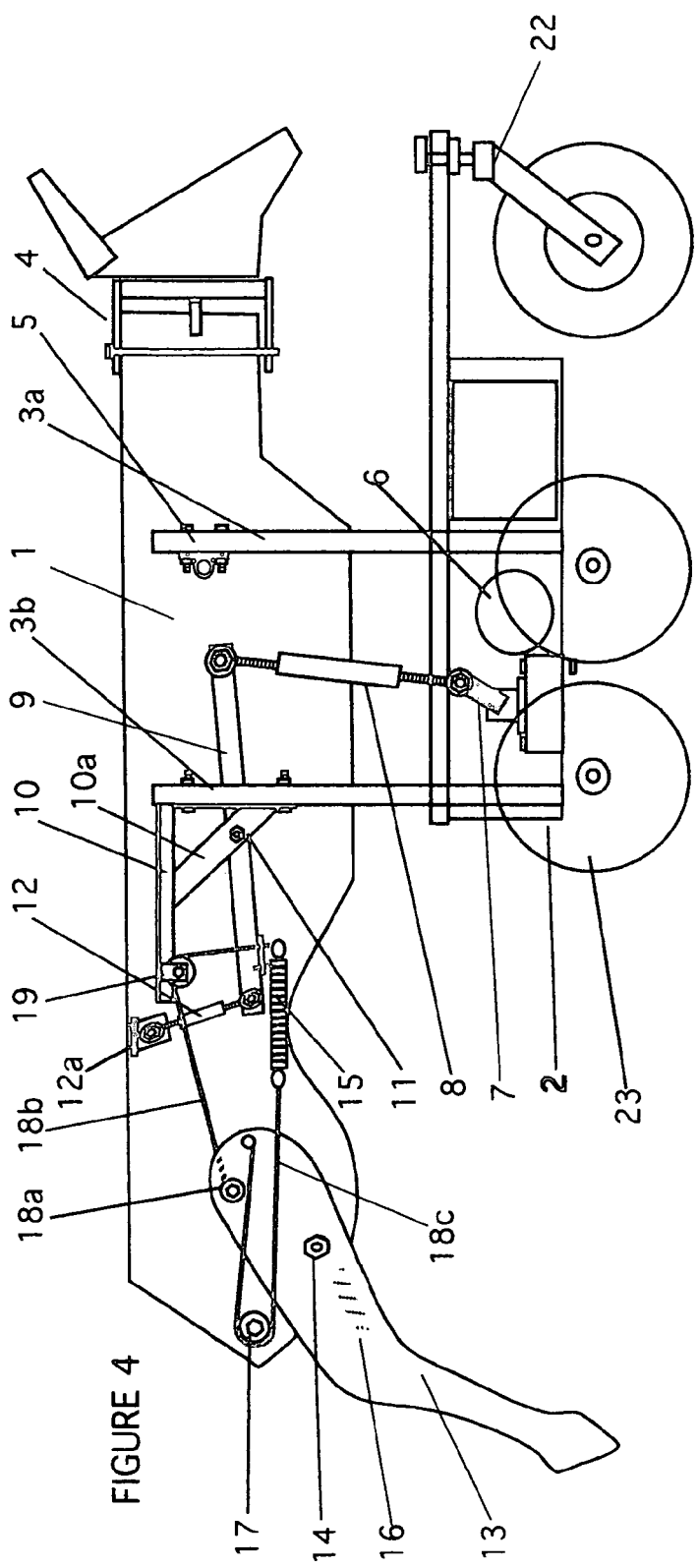
FIG. 4 is a schematic side view of the embodiment shown in FIG. 3 with the hind legs rearward and the back end down.
Figure 9A:
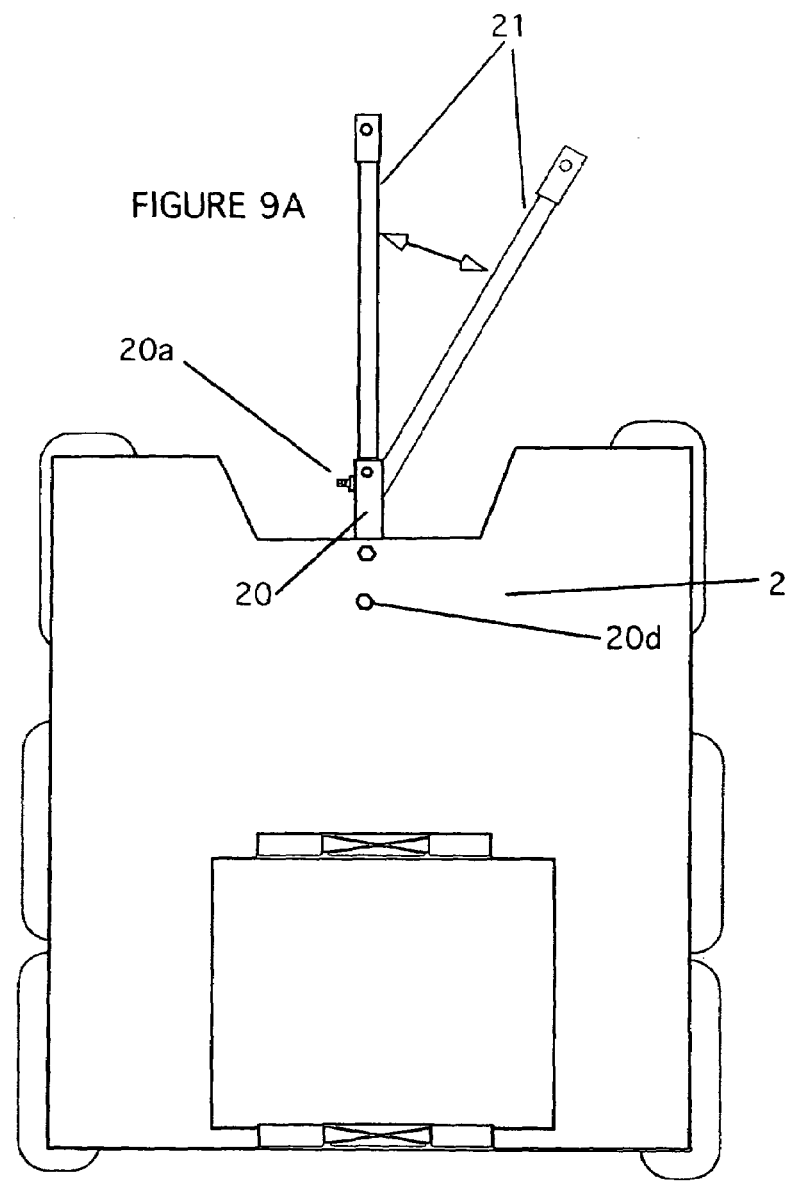
FIG. 9A is a an upper planar schematic view of the base showing the motor and battery for moving the steer body and legs and showing the releasable tow bar.

Further allowing the base 2 to be towed, or in the second embodiment (discussed below), to be moved under radio control, the invention preferably comprises a single front caster wheel 22 to enable the wheel to turn quickly to the right or left, although there may be a pair of turnable front wheels 22 (FIGS. 2 and 5), and at least one pair of rear wheels 23, and preferably two pairs as shown in FIGS. 1 and 9a, mounted on the base 2. Four rear wheels 23 provide a smoother ride through rough terrain (FIG. 4). The wheels are preferably 6 inches wide×15 inches diameter.

The base 2 is preferably essentially a plywood box with a fiberglass or hard plastic coating, on which the body 1 and means of moving the simulated steer may be mounted. The base 2 has a vertical support mechanism mounted thereon. The vertical support mechanism is preferably two vertical support posts 3a, 3b as shown in FIGS. 4 and 10-11, for example made of wood or metal and fixed to the top of the base. These posts and the attached parts used in movement of the parts of the steer assembly as discussed below in more detail may be enclosed in a covering made of metal, wood, plastic or other durable protective substance to protect them from dust and to give the simulated steer assembly a smoother appearance. Hinge pin 5 connects base 2 to the forward vertical post 3a so that the body 1 can move up and down around hinge pin 5 so body seems to have a running movement.

As shown in FIGS. 10-11, the support posts 3a and 3b, the slot 3c for rocker arm 9, and the access doors 3d are mounted on a motor compartment 2b, forward of which is the battery compartment 2a. Together labeled as cam drive mechanism 6, a one 12-volt battery, a gear motor, chain drive and sprocket as known in the art drive the cam motion and movement of the adjustable turnbuckle bolt and the attached rocker arm movement discussed below, so that when the wheels move, the rocker arm and the attached body 1 move through a sequence of positions determined by the connection of the rocker arm to the turnbuckle, the two opposite positions of which are shown in FIGS. 3 and 4.

A steer body 1, preferably a one-piece torso from the neck to the tail of the body 1 and generally shaped like a steer body as shown in FIG. 1, with a back end and a narrowed front end simulating a steer neck, is mounted on the two support posts, with the rearward 3b post being generally in the center of the body and connected to the back of the body 1 by means of turnbuckle bolt 12, shown in FIG. 13, and the forward post 3a being toward the front of the body and connected thereto by means of hinge pin 5 (FIG. 3). The body may be molded of sturdy materials such as plastic, or may be made of a plastic coating over plywood, or other materials as are known in the art to be similar to a living steer in having a back, sides and hindquarters section. The steer may be designed to be as realistic as is desired by the manufacturer.

In order to enable access to the working parts inside the body, such as for maintenance or adjustment, an access door 3d is provided in the side of the body (FIG. 1).

There are two hind legs 13, generally shaped like a steer's hind legs as shown in FIGS. 3-4, which are mounted at the back of body 1, and made to move back and forward and made to adjust from 10-26 inches apart from each other. The legs 13 move independently from each other forward and back, by means of a separate rocker arm 9, pulley support 19 and attached assembly (FIG. 13, discussed in more detail below). The legs 13 are mounted on the back end of the body by means of a leg hinge pin 14 (FIGS. 6-8) which allows forward and backward movement of the legs and spread of the leg from 10 to 26 inches in the preferred embodiment (FIG. 7). As shown in FIG. 8, the leg hinge pin comprises ½ inch bolt 14a, ½ inch lock nuts 14b, leg bushings 14c, and washers 14d. As shown in FIGS. 6-7, the outer portion of the bolt 14a is mounted on the downwardly extending sides of the body 1 to hold it to the body, while each bushing 14c is mounted in a leg 13 to hold the legs in place. A leg spring 16, preferably a spring that is 1 inch in width and 10 inches long, 3/16 in. gauge/150# is bent in to an arc as shown in FIGS. 6-7, and mounted between the legs 13 by means of bolt 16a and nut 16b.

Each of the legs is connected by a spring and cable system to the rocker arm 9 for moving the legs backward and forward. A power source (e.g., gear motor 6) is operatively connected to the rocker arm 9. A roller pulley 17 (FIG. 21), serving as the pivot point for cable 18c to pull the legs back and forth, is mounted on the sides of the body 1 above the mounted leg hinge pin, using bearing 17a allowing the roller pulley to spin freely, cable anchor 17b that bolts into the leg 13, and bolt shaft 17c on which the roller spins freely; (FIGS. 3-4, 21). Spring 15 shown in FIGS. 3-4 pulls the legs forward when the rocker arm 9 is up. When the rocker arm 9 is down, the legs are back.

Figure 16:
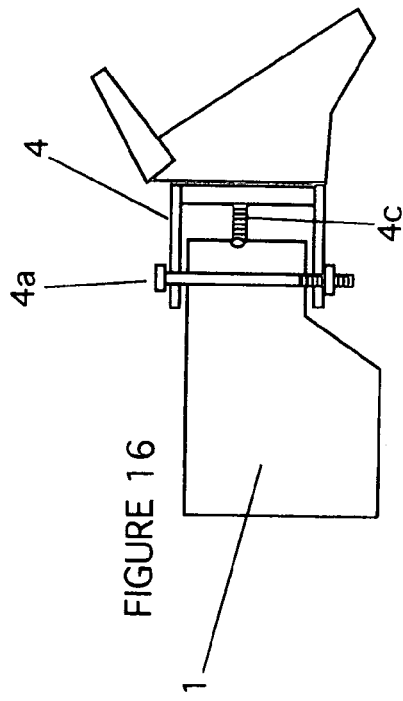
FIG. 16 is a side elevational schematic view of the head of the simulated steer showing the hinge bolt and neck spring.

A head portion 4b is mounted on the front end of body 1. Simulated steer heads having horns for roping that are commercially available for roping practice may be used for the head portion, or the head portion may be custom-made so long as it has simulated horns for roping practice. In either case, the head 4b is preferably mounted to the front end of the body 1 by means of a squared U-shaped bracket 4 (FIGS. 14-16) so that the head pivots left 45-60 degrees about a hinge bolt 4a inserted between through the bracket 4 and the body 1 and the head 4b pivots toward the left side when roped. A spring 4c (FIGS. 15-16) extending from the head 4b to the neck portion of the body 1 snaps the head 4b back to aiming straightforward from the body 1 when a rope is not pulling the head sideways.

Figure 9B:
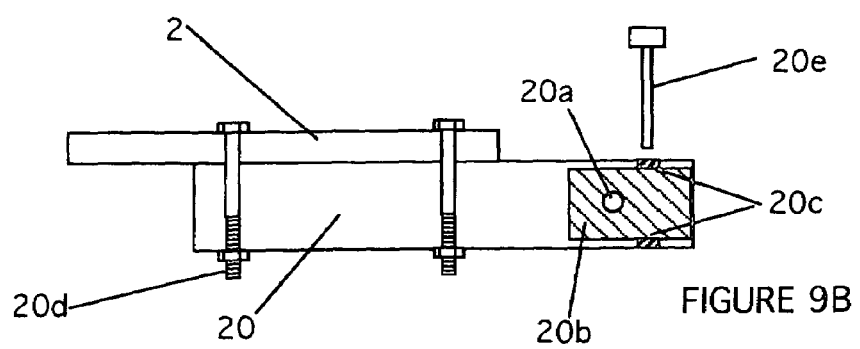
FIG. 9B is a side elevational schematic view of the tow bar.

Tow bar 21 (FIGS. 9a-9d) is releasably attached to tow bar release 20, which in turn is mounted to base 2 by means of bolts 20d. The tow bar release mechanism comprises a ½ inch release bolt pin 20a, open notch 20b for the tow bar 21 to release from, a ¾ inch notch 21a at the end of the tow bar 21 to fit over release bolt pin 20a, and ⅜ inch pin 21b holding the tow bar 21 and release 20 together. A ⅜-inch locking pin 20e (FIG. 9b) may be placed through hole 20c to lock keep the tow bar 21 from being released.

When the head 4b is pulled to the left, the tow bar release mechanism operates, and the tow bar is separated from the towing vehicle as the steer and base are pulled left. This allows the entire simulated steer assembly after the release to be pulled by the rope of the header that is over the simulated steer horns.

The simulated steer assembly's rocker arm 9 mounted on the vertical support mechanism is for moving the back end of the body up and down with respect to the front end of the body. There are two embodiments shown of how the rocker arm is structured for two different types of movement.

In the embodiment shown in FIGS. 3-4, when the rear of the simulated steer assembly is up, the hind legs swing forward (FIG. 3), and when the rear of the simulated steer assembly is down, the hind legs swing backward (FIG. 4). Support brace 10 for rocker arm movement is an L-brace (FIGS. 3-4 and 13), the vertical arm of which is attached to post 3b by bolts 10b as shown. Angle bracket 10a is attached to rocker arm 9 by means of hinge pin bolt 11. A pulley support 19 for cable 18b is bolted to the rearward end of support brace 10. Cables 18b,c are preferably ¼ inch steel or strap cables. Cable 18b extends through eye bolt 18a at the top of the legs and pulls the legs back when the rear of the simulated steer assembly is down. In particular, cable 18c is attached to the top of the leg, and then goes to roller pulley 17 and to spring 15. Cable 18b goes from rocker arm 9 to pulley support 19 to eye bolt 18a, which is rearward on the top of the leg of the site of attachment of cable 18b as shown.

Adjustment plate 9a, shown in detail in FIG. 12 has holes 9b through which the cable 18 loops to give the legs proper adjustment (the amount of cable 18 that is pulled through the holes changes the position of rocker arm 9 and thus the position of the legs, so that if the cable 18 is lengthened the legs can kick higher, and if shortened by pulling more of cable 18 through the holes, the kick is lower).

Figure 17A:
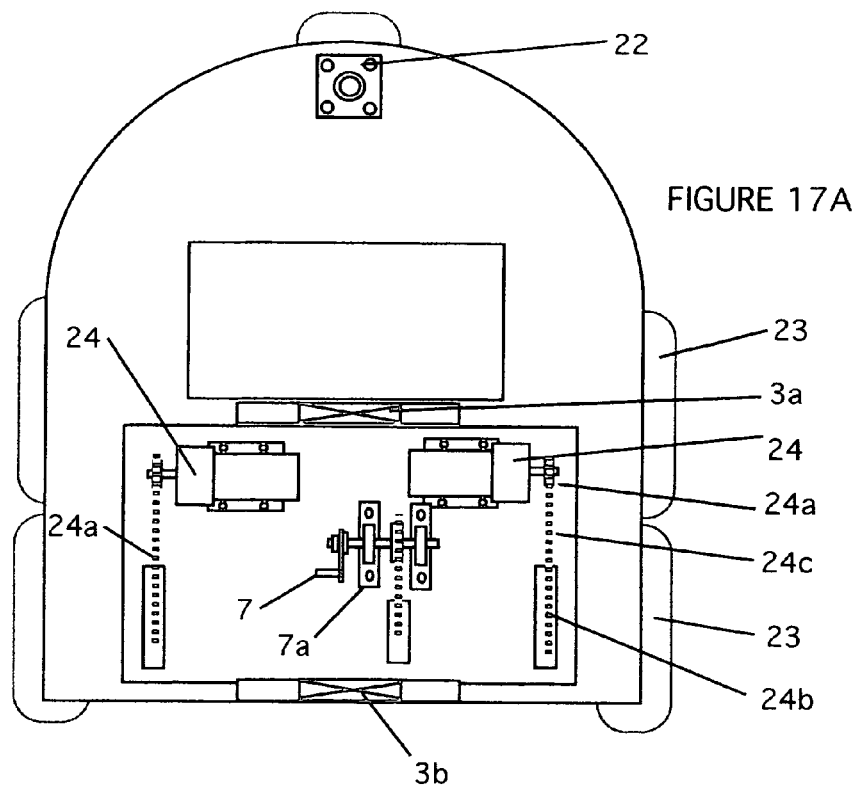
FIG. 17A is an upper schematic view of the radio-controlled embodiment of the base of the simulated steer assembly of the invention herein showing the motor and battery arrangement.
Figure 17B:
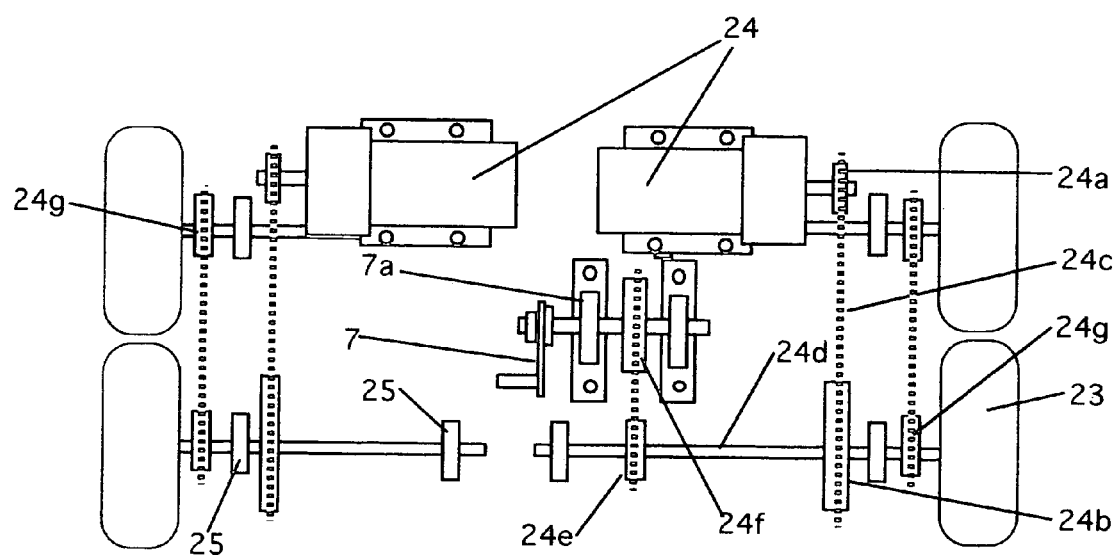
FIG. 17B is a detailed view of FIG. 17A in which the top layer of the base has been removed so that the cam components may be more easily viewed.
Figure 18:
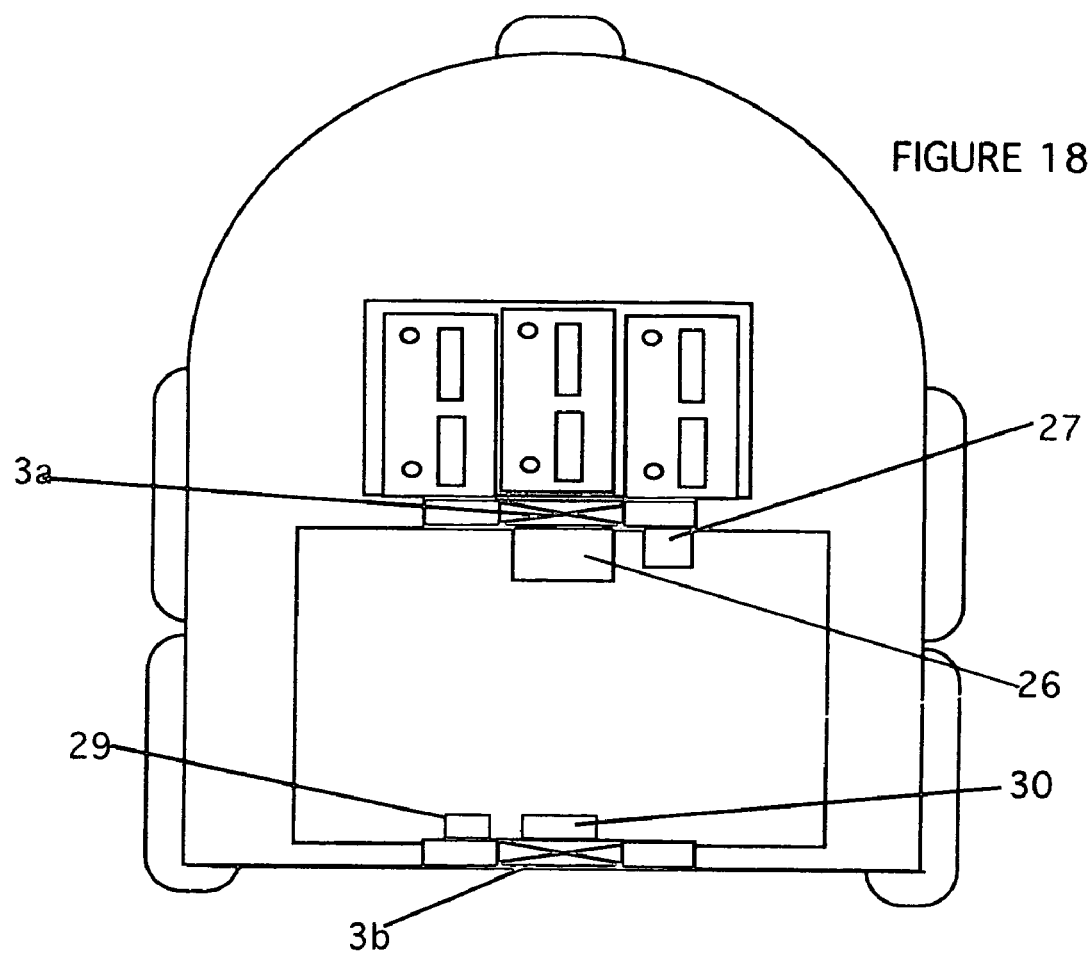
FIG. 18 is an upper schematic view of the embodiment of Figure A showing the golf car motor controllers, radio receiver and interface board.
Figure 19:
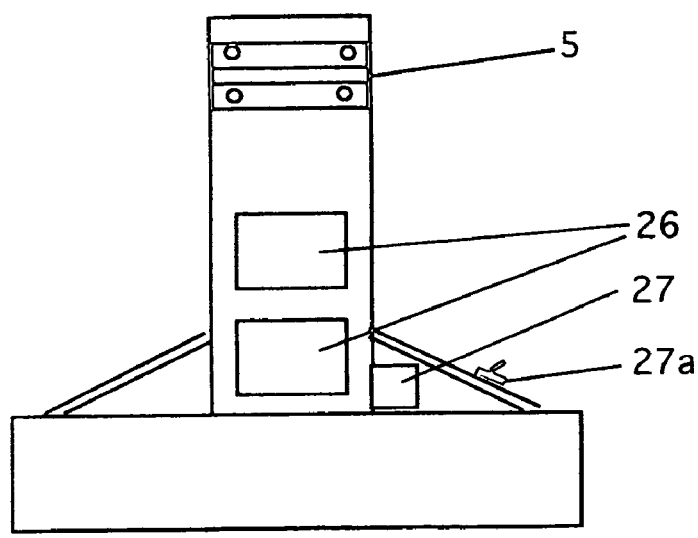
FIG. 19 is a back view showing the motor controllers and switch from the batteries to the motor controllers.
Figure 23:
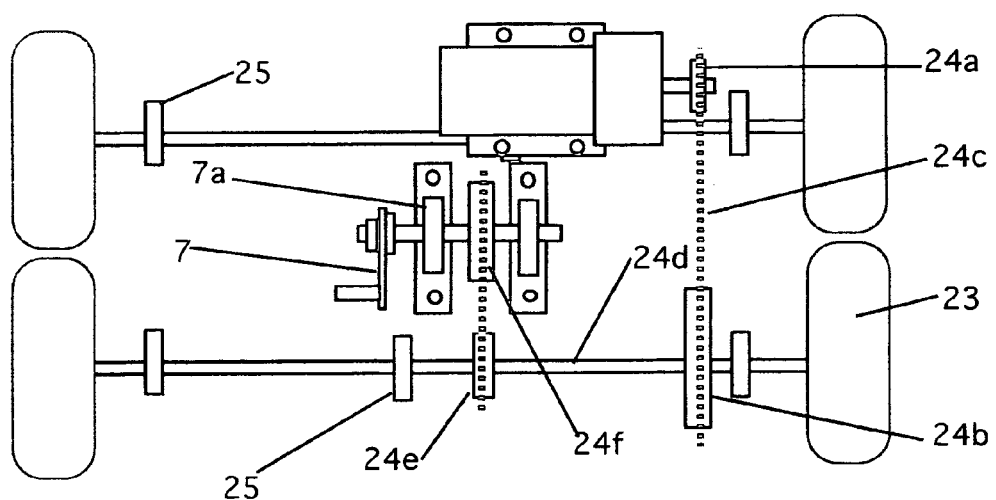
FIG. 23 is an upper schematic view of the radio-controlled embodiment of the invention with the base removed to show the motor and cam components.

Rocker arm 9 at its rearward end is connected to turnbuckle bolt 12 which in turn, in the preferred embodiment of the invention, is attached to the inside of top of body 1 as shown in FIGS. 3-4 by means of steel bracket 12a that is bolted to body 1 to allow adjustment of the height of the rear portion of the body 1 above the base 2. Rocker arm 9 at its forward end is connected to base 2 by means of adjustable turnbuckle bolt 8, allowing adjustment of the body 1 and rocker arm to change the height of the hooves of the legs from the ground. Two bearing blocks 7a support the drive cam 7 and raise it up so that it has room to turn (FIGS. 17A, 17B, 23). Thus, as shown in FIGS. 17A and 17B, one motor drives the wheels on each side, providing four-wheel drive. The motors can be made to drive the wheels on each side in the same direction, or to drive the wheels in opposite directions, resulting in a turning of the simulated steer assembly and base.

When the motor is on, the motor causes the adjustable turnbuckle bolt 8 to move up and down, which in turn causes the front end of the rocker arm 9 to move up and down. Movement of the front end of the rocker arm 9 upward causes the rear end of the rocker arm to move downward as shown in FIG. 4, which causes the lower part of turnbuckle bolt 12 to move down and forward, lowering the height of the rear of the steer assembly, changing the angle of the spring and cable for each leg, so that the legs go backward (FIG. 4). When the front end of the rocker arm moves downward, the rear end of the rocker arm moves upward (FIG. 3), and the legs go forward.

In an alternative version of the first embodiment of the invention (not shown), the rocker arm and associated components of the invention may be structured so that movement of the rear end of the steer downward causes the legs to go forward and movement of the rear end of the steer upward causes the legs to go backward. This is simply accomplished by instead of having the pulley support be located near the rear end of the rocker arm 9 as shown in FIGS. 3-4, it may be located above the rocker arm, close to the upper end of post 3b, with the cable attached near the forward end of the rocker arm 9.

Some users of the invention herein may prefer to have the legs move forward and backward without the rear of the simulated steer assembly moving up and down. This is easily accomplished by disconnecting the rocker arm 9 from turnbuckle bolt 12 so that rocker arm 9 (and the attached leg 13) can move without causing a resultant movement of the body 1.

In the second main embodiment of the invention, movement of the simulated steer assembly is radio controlled (FIGS. 17-20, 22-23). Two 12, 24 or 36, preferably 24-36, volt shunt motors 24 are attached to a sprocket and chain assembly that includes small motor sprocket 24a, axle sprocket 24b, sprocket chain 24c, axle sprocket drives cam 24d, axle sprocket drive cam 24e, cam sprocket 24f and axle sprockets 24g (FIG. 17B). The sprocket chain 24c drives the front and back wheels on each side. Axle bearings 25 for the wheels mount under the floor base 2 (FIG. 23). The motors preferably are very powerful and have a torque of at least about 1200 pounds (600 pounds each), which is much more powerful than that used in a golf cart, to allow sudden changes in movement. The motors as well as the other components used in the radio control, except for the radio itself, are mounted on base 2.

Figure 20:
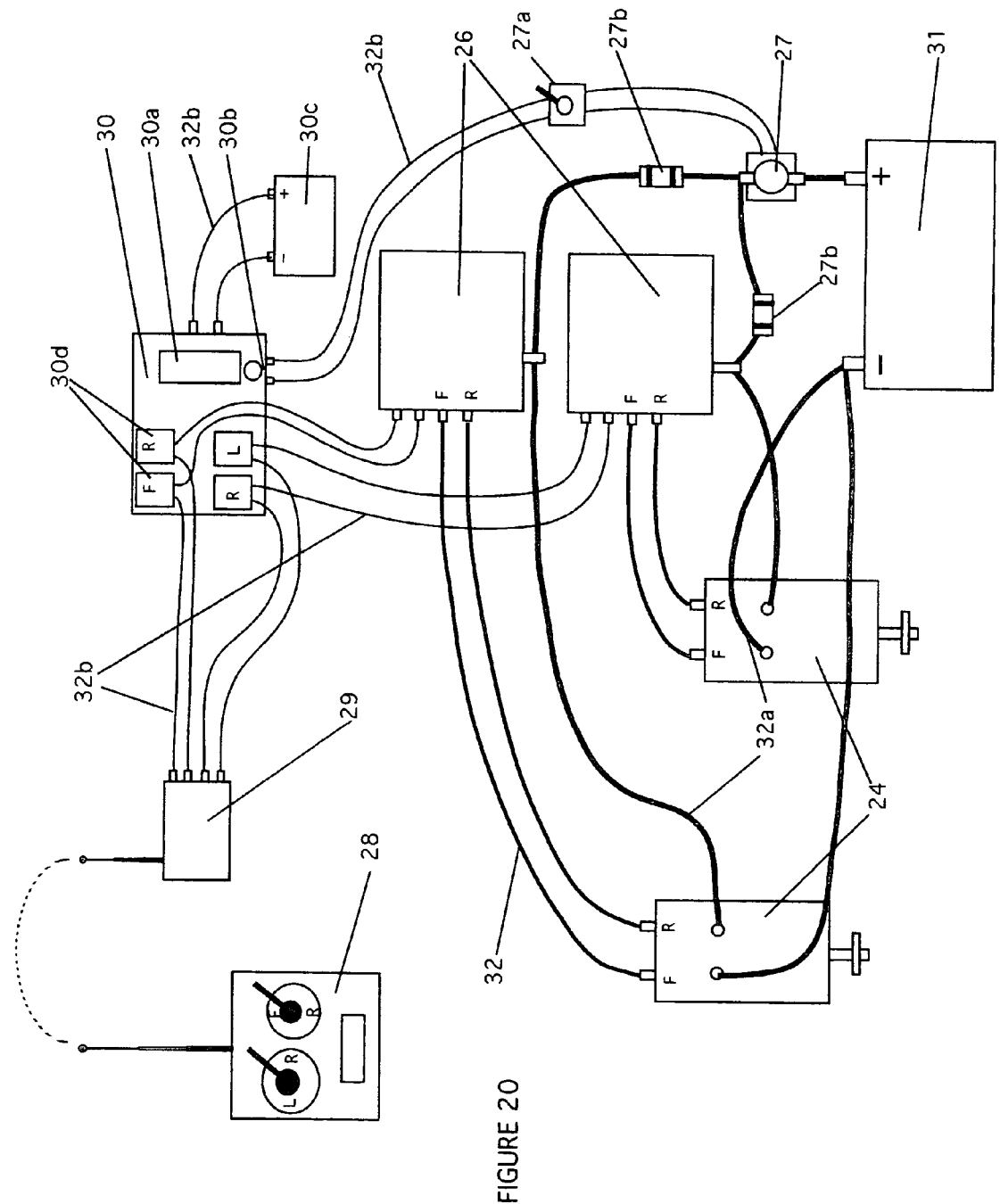
FIG. 20 is a schematic diagram of the radio control mechanism of the second embodiment of the invention.
Figure 22:
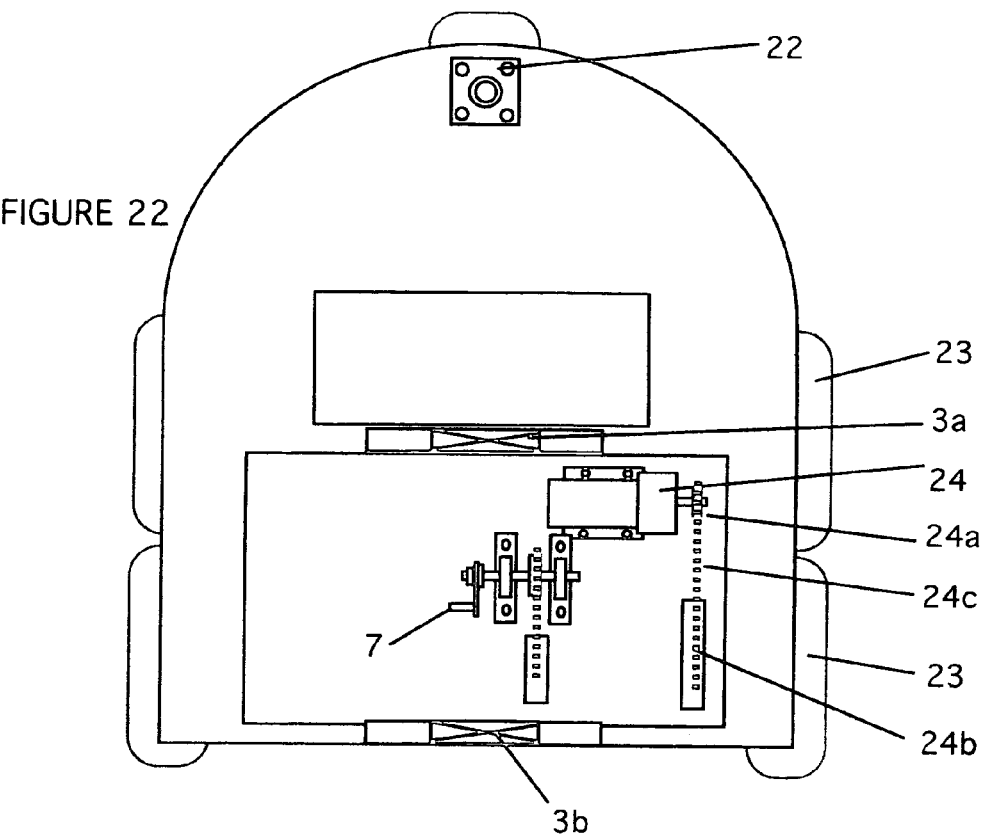
FIG. 22 is an upper schematic view of the radio-controlled embodiment of the invention showing a single motor drive having forward and reverse.

The radio used in the second embodiment of the invention may be a radio adapted from that used to fly scaled-down helicopters, utilizing a receiver with antenna. The 3-6 channel hand held radio 28 (FIG. 20) that is preferred is digital and programmable to a particular receiver. The radio 28 is radio-linked to the receiver and sends signals using radio receiver technology known in the art, for the speed, forward and reverse, to radio receiver 29, a 4-channel radio receiver to interface computer board 30, programmed with a computer chip (3-5 volts) to have forward and reverse modules, to decipher the radio control (e.g., joystick) command and to send the correct forward and reverse signals at low voltage to motor controllers 26. The preferred wires shown in FIG. 20 are wire 32 (a #12 wire), wire 32a (a #4 wire), and wire 32b (a #13 wire).

Figure 29:
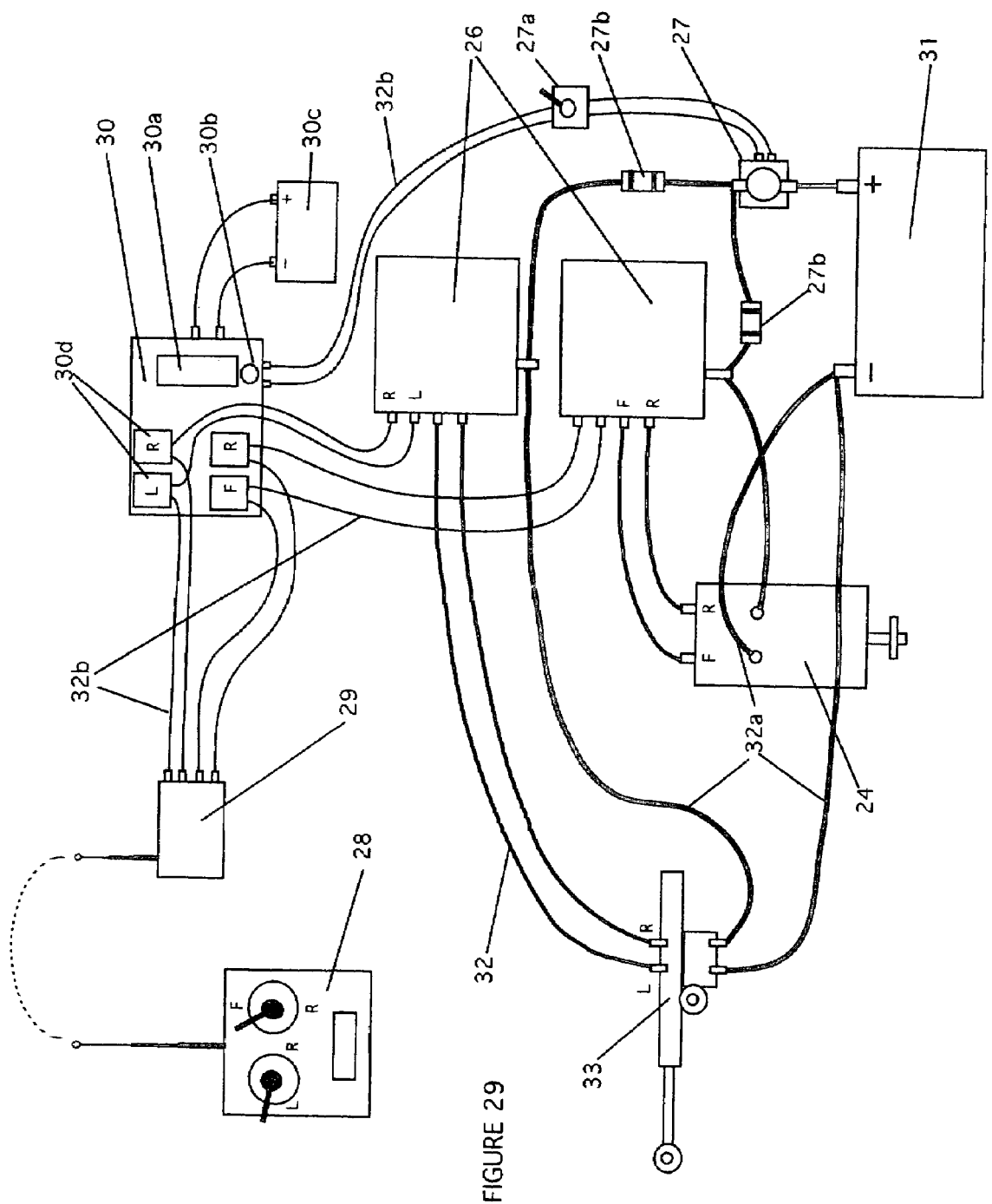
FIG. 29 is a schematic diagram of the radio control mechanism of the second embodiment of the invention in which there is an actuator.

The speed of the motor on each side relative to the speed on the other side controls whether the assembly goes straight or turns right or left. This is accomplished using the interface board 30. The interface board 30, shown in FIGS. 20 and 29, is programmed with forward 30a and reverse 30d modules as is known in the art, so that the appropriate forward or reverse signals are sent to the motor controllers. Radio-received on-off switch 30b is provided. enables the steer assembly to turn right or left. Because there can be interference from the motors and other electronic and electric components used in the invention, as is the case in other robotics apparatuses using multiple motors and utilizing forward and reverse signals, additional modifications of the programming associated with the interface board 30 is generally required for specific arrangements of the electronic and electric components as is known in the art with such radio-controlled robots and the like (for example, in Robot Power, Roy, W A; Grand Wing Servo-Tech Co., Ltd., Taiwan; and RoboNova-1, Poway, Calif.).

The interface board 30 preferably has trouble-shooting blinking lights (not shown) as are known in the art to indicate whether the appropriate signals for turning, or forward or reverse movement are being received. The motor controllers are preferably those used for electric golf carts and control the power input to either the right or left motor. The receiver may have six channels if it is desired to add up and down movement to that being controlled by the radio. Contactor switch 27 (250 amp) allows switching from the batteries to the motor controllers via manual on-off switch 27a, which is a built-in heavy duty safety switch to shut down power to the controllers. The circuitry also includes a 250 amp 50-volt fuse 27b, as well as a small 12-volt battery 30c to power the interface computer board 30 and receiver 29. The onboard radio control computer is programmed with multiple control panels for forward, reverse, left and right, as well as the speed, smoothness of movement of the base using golf cart engineering components and controllers and standard safety features such as are used in golf carts. A high horsepower is necessary in this embodiment so that the structure being controlled, in this preferred case, the steer assembly, can move rapidly in any direction and change directions rapidly and powerfully for fast, sudden movement.

In an alternative version of the second preferred embodiment there is a servo motor on the front of the base 2 to control the front wheel, which can be radio-controlled. In this version, the front caster wheel 22 (FIGS. 24-28) is controlled by 12 volt linear actuator 33 (FIG. 29), and includes caster pivot pin 33a so the caster wheel 22 can turn right to left, caster pin bearings 33b, linear actuator push, pull arm 33c push, pull arm used to turn the machine from right to left, linear actuator arm hinge bolt 33e, and caster hinge arm 33f.

There are preferably 2-3 batteries used in the second embodiment which are preferably 12-volt batteries connected in series, because in this embodiment, the apparatus is self-propelled and not towed.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. A simulated steer assembly for roping practice, comprising:
   a) a base having a vertical support mechanism mounted on the base;
   b) a body movably mounted on the vertical support mechanism and having a front end, a back end, a left side and a right side;
   c) legs mounted on the back end of the body;
   d) a head portion mounted on the front end so that the head pivots toward the left side when roped;
   e) a rocker arm mounted on the vertical support mechanism;
   f) a spring and cable system connecting each of the legs to the rocker arm for moving the legs backward and forward;
   g) a power source operatively connected to the rocker arm; and
   h) a means of moving the simulated steer assembly along a ground surface.

2. The simulated steer assembly of claim 1, wherein the means of moving the simulated steer assembly comprises a pair of front wheels and two pairs of rear wheels, and a tow bar connected to the base and attachable to a towing vehicle.

3. The simulated steer assembly of claim 2, further comprising a tow bar release mechanism for releasing the tow bar from a towing vehicle when the head portion pivots to the left side.

4. The simulated steer assembly of claim 3, wherein the release mechanism comprises a release bolt pin, and wherein the tow bar has a notch that fits over a release bolt pin so that when the head is pulled to the left, the tow bar is separated from the towing vehicle.

5. The simulated steer assembly of claim 1, wherein the means of moving the simulated steer assembly comprises a turnable front wheel, and at least one pair of rear wheels mounted on the base.

6. The simulated steer assembly of claim 1, wherein the means of moving the simulated steer assembly comprises at least one front wheel, and at least one rear wheel on each side of the simulated steer assembly, a radio receiver mounted on the simulated steer assembly and operatively connected to the simulated steer assembly to control movement of the simulated steer assembly, and a portable radio transmitter programmed to send signals to the radio receiver to control movement of the simulated steer assembly.

7. The simulated steer assembly of claim 6, wherein the movement of the simulated steer assembly is provided using a motor controller for the rear wheels on each side of the simulated steer assembly, and an interface board programmed with forward and reverse modules that signal the motor controllers in response to signals from the radio transmitter.

8. The simulated steer assembly of claim 6, wherein the front wheel is a turnable caster wheel that is controlled by a servo motor that is radio-controlled.

9. A method of practicing steer roping, comprising providing a simulated steer assembly according to claim 1.

10. The method of claim 9, comprising further providing a radio receiver mounted on the simulated steer assembly and operatively connected to the simulated steer assembly to control movement of the simulated steer assembly, and a portable radio transmitter programmed to send signals to the radio receiver to control movement of the simulated steer assembly.

* * * * *